Aug. 7, 1962

J. REDEL 3,048,590

NEW DERIVATIVES OF TRIOXO-2,4,6-PIPERIDINE
AND THE PROCESS OF PREPARING SAME

Filed April 21, 1959

INVENTOR:
JOSEPH REDEL
BY
Richardson, David and Nordon
ATTYS.

United States Patent Office 3,048,590
Patented Aug. 7, 1962

3,048,590
NEW DERIVATIVES OF TRIOXO-2,4,6-PIPERIDINE AND THE PROCESS OF PREPARING SAME
Joseph Redel, Paris, France, assignor to Chimie et Atomistique, Paris, France, a corporation of France
Filed Apr. 21, 1959, Ser. No. 807,918
Claims priority, application France Apr. 23, 1958
2 Claims. (Cl. 260—281)

Figure 1:
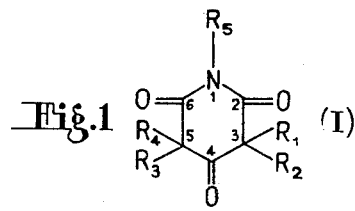

The present invention relates to new compounds of 2,4,6-trioxo-piperidine satisfying the general Formula I shown in FIG. 1 of the accompanying drawing, wherein $R_1$, $R_2$, $R_3$ and $R_4$ are each an aryl radical such as a phenyl or alkyl radical and in particular a lower alkyl radical, and $R_5$ is hydrogen, an alkyl radical and in particular a lower alkyl radical or an amino-alkyl radical which is substituted or unsubstituted on the N atom.

The new compounds can be used as starting materials for the synthetic preparation of new active compounds. Furthermore, they possess in themselves sedative, anticonvulsion and hypnotic properties which can be exploited in human or veterinary medicine.

Another object of the invention is to provide a process of preparing these new compounds. This process comprises condensing a disubstituted cyanacetyl chloride having the formula:

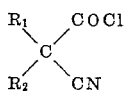

with an ester, for example an ethyl ester of a disubstituted acetic acid having the formula:

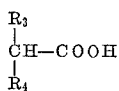

wherein $R_1$, $R_2$, $R_3$ and $R_4$ have the aforementioned significations, thereafter cyclizing the product thus obtained into substituted 2,4,6-trioxo-piperidine and treating with an alkylating compound when the radical $R_5$ is not hydrogen.

Figure 2:
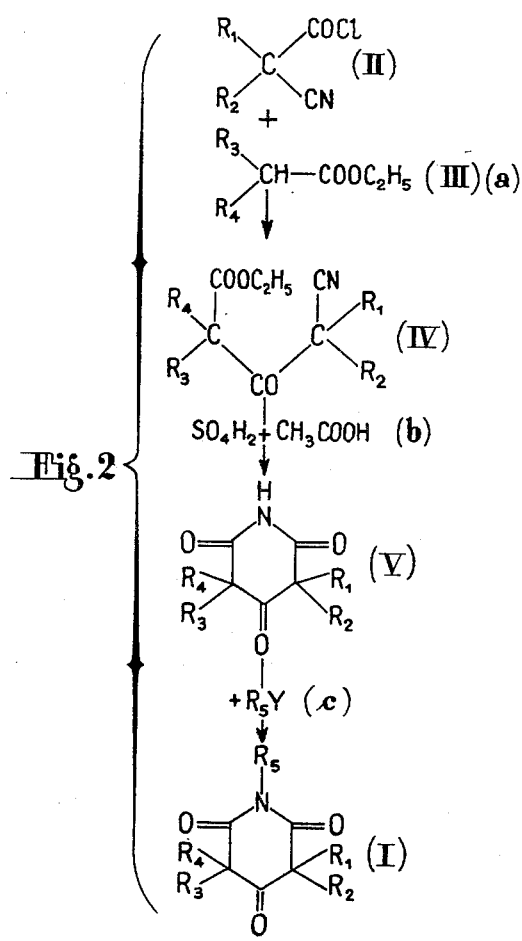

FIG. 2 of the accompanying drawing shows at $a$, $b$, and $c$ the abovementioned stages of the present process which will be referred to hereinafter. The condensation of the disubstituted cyanacetyl chloride (II) with the disubstituted acetic acid ester (III), shown to be ethyl ester in the drawing, is advantageously effected by contact of the reagents at low temperature in the presence of sodium triphenyl-methyl.

The cyclization of the cyano-ester (IV) thus obtained into substituted 2,4,6-trioxo-piperidine (V) is effected by heating at the temperature of the water bath with a mixture of acetic acid and sulphuric acid.

The alkylation of the compound (V), if desired, can be effected in the known manner by means of an alkylating compound $R_5Y$ corresponding to the alkyl or amino-alkyl radical it is desired to introduce. This alkylating compound could be in particular an alkyl sulphate, an alkyl halogenide or an alkylamino halogenide.

The disubstituted cyanacetyl chlorides (II) which constitute the starting point of the process of the invention, could be obtained by reaction of the corresponding acid which can be, if desired, obtained synthetically from a mono-substituted cyanacetic acid with phosphorus pentachloride.

The following examples illustrate the invention without the scope of the latter being limited thereto.

EXAMPLE 1.—3 - PHENYL - 3 -ETHYL - 5,5 -DIMETHYL - 2,4,6 - TRIOXO - PIPERIDINE (COMPOUND I, $R_1=C_6H_5$, $R_2=C_2H_5$, $R_3=R_4=CH_3$, $R_5=H$)

(a) A Preparation of Ethyl-2-Phenyl-2-Ethyl-2-Cyano-Acetyl-Isobutyrate (Compound IV)

Added to a solution of sodium triphenyl-methyl prepared in the usual manner (W.B. Renfrow, C. R. Hauser, Organic Syntheses, 1939, 19, 83) from 50 g. of triphenyl-methyl chloride, are 21.2 g. of ethyl isobutyrate (III). When the mixture is discolored—which requires about 10 minutes—the following is added in one go in an ice bath:

Phenyl-ethyl-cyanacetyl chloride (II) _____g__ 38

The mixture is left for half an hour in the ice bath and then one hour at room temperature. After adding water and treating the mixture in usual way, the raw neutral fraction is collected, namely 85 g. The major part of the triphenyl-methane is eliminated by precipitation with petrol ether (160 cc.). After concentration, 60 cc. of iced methanol are added to the mother liquors which further precipitates a little triphenylmethane, of which a total amount of 35 g. is collected. The last filtrate is concentrated and distilled. There is collected the fraction:

$E_{0.05mm.}=118$–$127°$ C., weighing 40.4 g.

which constitutes the desired product which still contains a little triphenyl-methane.

(b) Cyclization 36.8 g. of the foregoing distillate, to which are added 37 cc. of acetic acid and 37 cc. of sulphuric acid, are put into a water bath for 5 hours. The mixture is thereafter poured onto heaped ice and the mixture is alkylated in the presence of ice. The suspension thus obtained is filtrated and the filtrate precipitated by the bubbling of carbonic gas and then drained. Thus the raw 3-phenyl-3-ethyl-5,5-dimethyl-2,4,6-trioxo-piperidine is obtained, which weighs 22.2 g. and melts at 68–73° C. By crystallization in hexane, the pure product in the form of white crystals is obtained.
M.P.=78–80° C. C%: 69.30, 69.34, calculated 69.5; H%: 6.69, 6.71, calculated 6.56; N%: 5.40, 5.44, calculated 5.41.

EXAMPLE 2.—1,5,5 - TRIMETHYL - 3 - PHENYL - 3-ETHYL - 2,4,6 - TRIOXO - PIPERIDINE (COMPOUND I, $R_1=C_6H_5$, $R_2=C_2H_5$, $R_3=R_4=R_5=CH_3$)

0.52 g. of sodium is dissolved in 20 cc. of absolute ethanol and then the following are added successively:
5.9 g. of 3-phenyl-3-ethyl-5,5-dimethyl-2,4,6-trioxo-piperidine obtained as indicated in Example 1.
4.9 g. or 2.1 cc. of methyl iodide, after which the mixture is refluxed for 6 hours, concentrated until dry, normal hydroxide is added and the mixture extracted with ether. After drying and elimination of the solvent, there is obtained an oil which crystallizes by trituration in a Dry Ice bath.
Weight=5.5 g.
Yield=88%
M.P=35–37° C.

By crystallizing in light petroleum ether, the following pure product is obtained:
M.P.=46–47° C. C%: 70.39, 70.34, calculated 70.30%.; H%: 7.04, 7.07, calculated 6.96%; N%: 5.12, 5.09, calculated 5.13%.

EXAMPLE 3.—1 - (BETA - DIMETHYL - AMINO-ETHYL) - 3 -PHENYL - 3 - ETHYL - 5,5 - DIMETHYL - 2,4,6 - TRIOXO - PIPERIDINE (COMPOUND I, $R_1=C_6H_5$, $R=C_2H_5$, $R_3=R_4=CH_3$, $R_5=(CH_2)_2=N(CH_3)_2$)

This compound is prepared in the form of a hydrochloride in the following manner:

2.9 g. of sodium are dissolved in 60 cc. of absolute ethanol and then the following are added in succession:

3 - phenyl 3 - ethyl - 5,5 - dimethyl - 2,4,6 - trioxo-piperidine _____g__ 14.4
Hydrochloride of dimethyl - aminoethyl chloride _____g__ 9.6 and the mixture is refluxed for 8 hours. It is then thrown into a large volume of water and a basic fraction is separated in the usual manner. In this way 12 g. of an oil are obtained. This oil is dissolved in absolute ethanol and treated by an excess of ethanolic hydrochloric acid. After concentrating until dry, the desired product is obtained.

Weight=13 g.
Yield=64%

By crystallizing in acetone, the pure product is obtained:

M.P.=169–170° C. C%: 62.40, 62.35, calculated 62.21; H%: 7.52, 7.47, calculated 7.37; N%: 7:51, 7.55, calculated 7.64; Cl%: 9.63, 9.71, calculated 9.70.

The scope of the invention is not limited to the described examples which have been given merely by way of example.

Having now described my invention what I claim as new and desire to secure by Letters Patent is:

1. 1,5,5-tri-lower alkyl-3-phenyl-3-lower alkyl-2,4,6-trioxo-piperidine.
2. 1 - (beta - dimethyl - aminoethyl) - 3 - phenyl - 3-lower alkyl-5,5-di-lower alkyl-2,4,6-trioxo-piperidine.

References Cited in the file of this patent

Erlenmeyer et al.: Helv. Chim. Acta, vol. 20 (1937), pp. 1388–1393.
Rohnert: Berichte, vol. 90 (1957), pp. 118–121.